Figure 6:
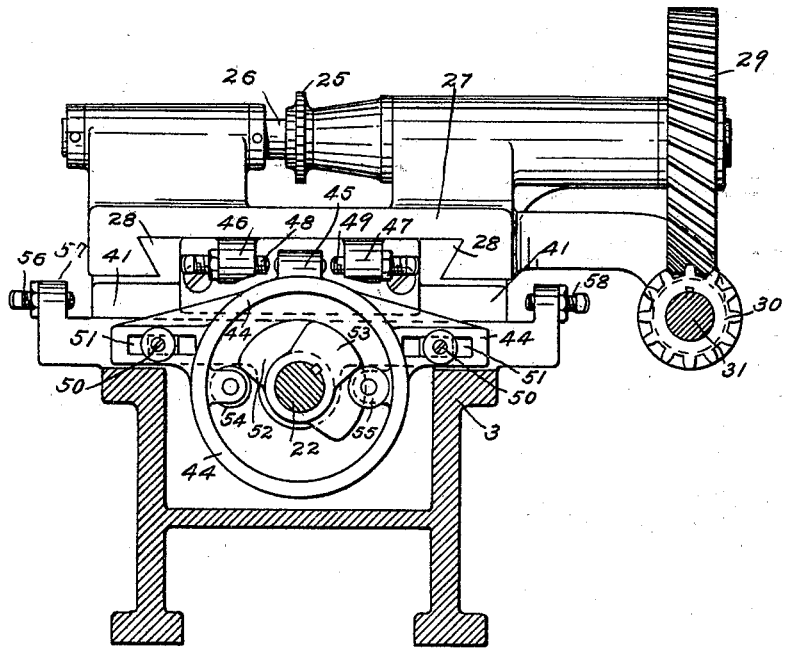

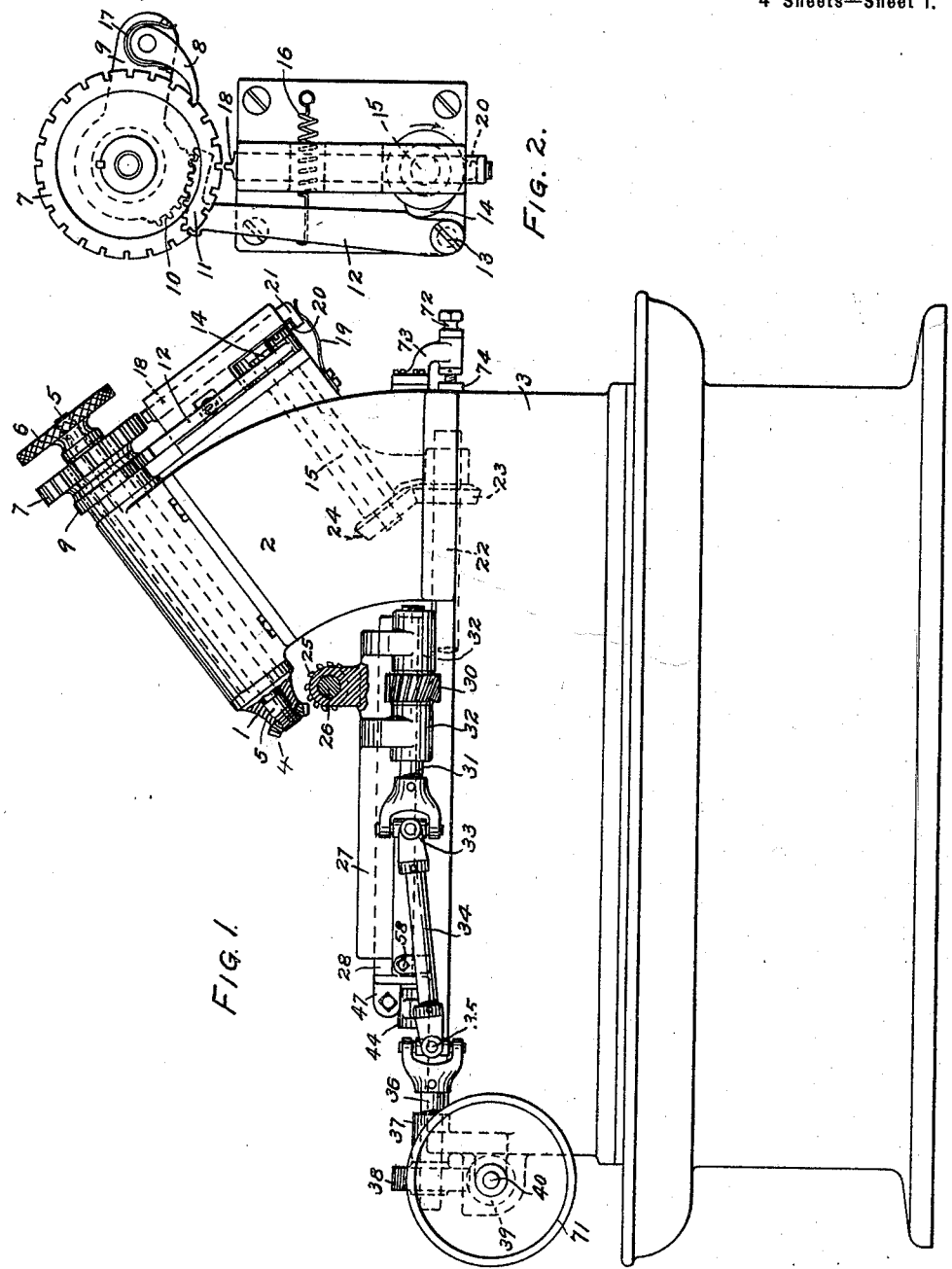

No. 624,676. Patented May 9, 1899.
E. H. PARKS.
GEAR CUTTING MACHINE.
(Application filed Feb. 25, 1898.)
(No Model.) 4 Sheets—Sheet 2.
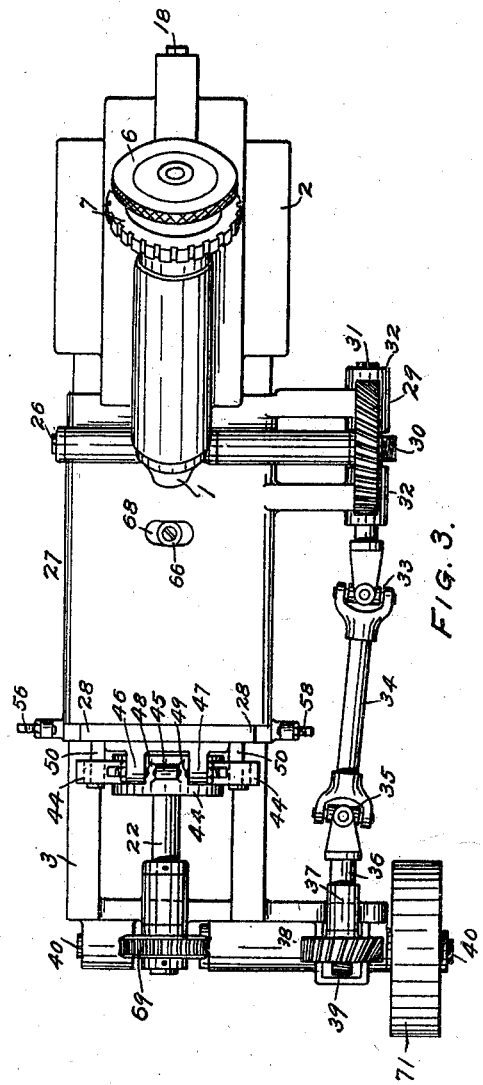
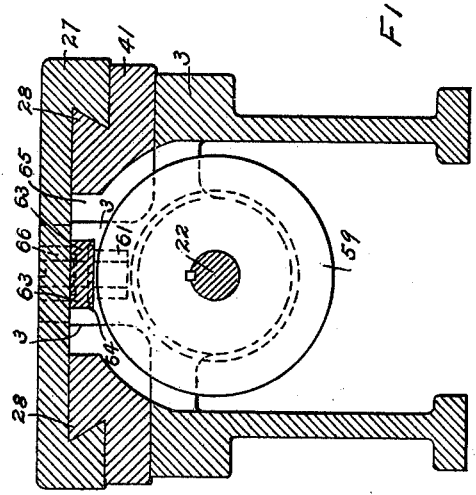
WITNESSES,
R. A. Bates
Ira L. Fish
INVENTOR,
Edward H. Parks
By Wilmarth H. Thurston
ATTY.

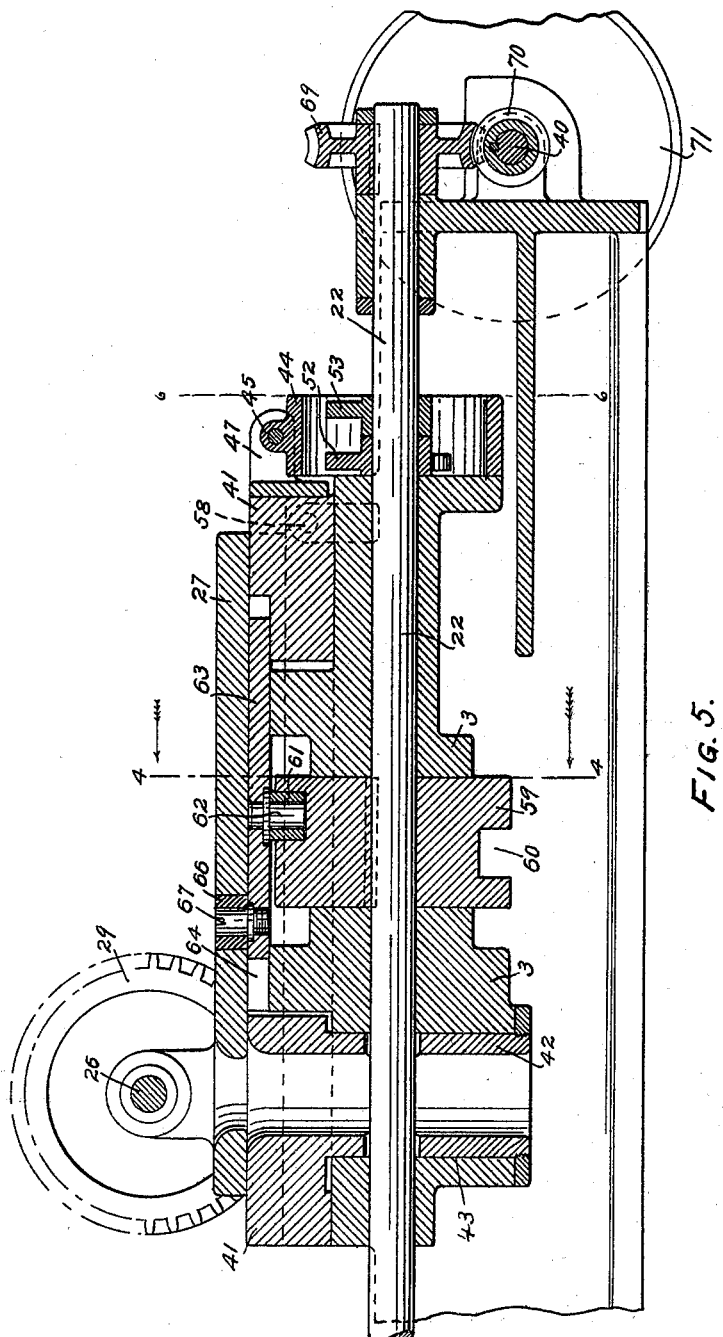

No. 624,676. Patented May 9, 1899.
E. H. PARKS.
GEAR CUTTING MACHINE.
(Application filed Feb. 25, 1898.)

(No Model.) 4 Sheets—Sheet 4.

WITNESSES, INVENTOR,
R. A. Bates Edward H. Parks
Ira L. Fish BY Wilmarth H. Thurston
ATT'Y.

UNITED STATES PATENT OFFICE.

EDWARD H. PARKS, OF PROVIDENCE, RHODE ISLAND, ASSIGNOR TO THE BROWN & SHARPE MANUFACTURING COMPANY, OF SAME PLACE.

GEAR-CUTTING MACHINE.

SPECIFICATION forming part of Letters Patent No. 624,676, dated May 9, 1899.

Application filed February 25, 1898. Serial No. 671,651. (No model.)

*To all whom it may concern:*

Be it known that I, EDWARD H. PARKS, of the city and county of Providence, in the State of Rhode Island, have invented certain new and useful Improvements in Gear-Cutting Machines; and I do hereby declare the following specification, taken in connection with the accompanying drawings, forming a part of the same, to be a full, clear, and exact description thereof.

The invention relates more especially to that class of machines for cutting bevel-gears in which the gear-blank is carried by a revoluble support which is intermittently revolved at the proper time and in which the blank is acted upon by a revolving cutter carried in a reciprocating carriage, although it will be understood that the invention may be embodied in other machines where it is desirable to change the angular relation between the work and cutter between successive cuts.

In bevel-gears the sides of the teeth converge and the angular relation between the cutter and work must therefore be changed in forming the opposite sides of the teeth. It has been customary heretofore to adjust the work and cutter in proper relation to form one side of the teeth and to maintain this adjustment until one side of all the teeth has been cut, the work being indexed after each cut and the cutter acting upon the stock as the carriage moves forward and running idly on the return movement of the carriage. The adjustment is then changed to bring the cutter and work into proper relation to form the other side of the teeth and the teeth finished in a similar manner. With this manner of cutting the gears the blank must be indexed through two revolutions and the time required for returning the cutter-carriage after each cut is lost time. With the present invention the gear is completed when the blank has been indexed through a single revolution, and the cutter acts upon the stock during both its forward and return movement, thus increasing the rapidity with which the gear is cut and correspondingly increasing the efficiency of the machine. This is accomplished by changing the angular relation between the cutter and work after the forward movement of the cutter, so that the cutter will act upon the stock during the return movement as well as during the forward movement. In order that the same side of each tooth may be cut during the forward movement of the cutter, it is preferred to change the angular relation of the cutter after each return movement also, although this is not essential.

In embodying the invention in a bevel-gear-cutting machine it is preferred to change the angle between the cutter and work by swinging the cutter-carriage about an axis after each forward movement and to swing the carriage back to its former angular position after the return movement, the indexing of the gear-blank taking place after the return movement of the carriage. In embodying the invention in some forms of machines it may be found desirable to reciprocate the work instead of the cutter or to change the angular relation of the cutter and work by movement of the work-support rather than the cutter-support, and it will be understood that such variations or other variations in the construction could be made without departing from the invention, which consists in a work-support and cutter-support, one or both of which reciprocate, and mechanism for changing the angle between the cutter and work between the forward movement and the return movement of the reciprocating part.

The invention also consists in the further features and combinations hereinafter described, and set forth in the claims.

Figure 7:
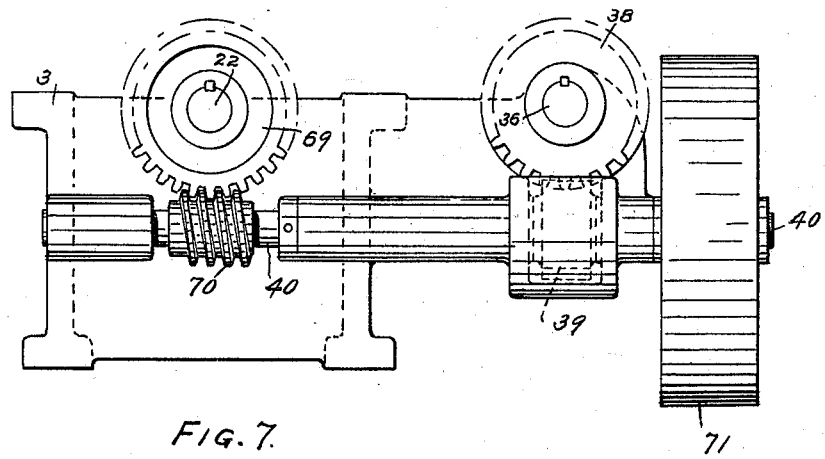

Referring to the drawings, Figure 1 is a side elevation of a bevel-gear cutter embodying the present invention. Fig. 2 is a detail elevation of the indexing mechanism. Fig. 3 is a plan view of the machine. Fig. 4 is a section on line 4 4, Fig. 5. Fig. 5 is a longitudinal sectional view. Fig. 6 is a section on line 6 6, Fig. 5; and Fig. 7 is an end elevation.

Referring to Figs. 1 and 2, the work-support consists of a spindle 1, mounted in bearings secured to a standard 2, which is in turn mounted on the frame 3. The gear-blank 4 may be secured to the spindle by any suitable means—as by an arbor 5, which passes through the spindle—and has mounted on its rear end an internally-threaded hand-wheel 6 for drawing the gear-blank against the end of the spindle. The spindle is indexed by means of a ratchet-wheel 7, secured thereto, which is engaged by a pawl 8, pivoted on an arm 9, loosely mounted on the spindle. The pawl-carrying arm 9 is provided with gear-teeth 10, which are engaged by a gear-segment 11, formed on the end of a lever 12, pivoted at 13 and engaged by a cam 14, secured to a shaft 15. The lever is held in engagement with the cam by means of a spring 16, and as the shaft 15 revolves the cam rocks the lever, thus oscillating the pawl-carrying arm and causing the pawl to intermittently rotate the work-carrying spindle. The pawl is held in engagement with the ratchet-wheel by a spring 17. The spindle is held in position by a locking-bolt 18, the upper end of which is forced into engagement with one of the notches in the ratchet-wheel by a spring 19. The bolt is withdrawn at the proper time to allow the forward movement of the spindle by a cam 20, secured to the shaft 15, which cam engages a shoulder 21 on the end of the bolt. The shaft 15 is driven from a continuously-revolving shaft 22 by means of bevel-gears 23 and 24, mounted upon shafts 22 and 15, respectively.

The cutter 25 is secured to a shaft 26, mounted in a cutter-carriage 27, guided on ways 28, Fig. 6. A spiral gear 29 is secured to the end of the cutter-shaft 26 and is engaged by a spiral gear 30, secured to a short shaft 31, mounted in bearings 32 on the side of the carriage. The shaft 31 is connected by means of a universal joint 33 to a link 34, the other end of which is connected by a similar joint 35 to the end of a shaft 36, mounted to slide in a bearing 37 on the frame 3. The shaft 36 has a sliding connection with a spiral gear 38, which is engaged and driven by a spiral gear 39, secured to the transverse driving-shaft 40, Fig. 7. By these connections the cutter-shaft is continuously driven without interfering with the movements of the cutter-carriage.

The ways 28, on which the cutter-carriage is mounted, are formed on a swivel-bed 41, mounted upon the frame 3 and provided with a depending pivot post or stud 42, which fits within a circular recess 43 in the frame and is cut away to allow the passage of shaft 22. The bed 41 is oscillated about its pivot as the carriage reaches the limit of its movement in each direction by a reciprocating slide 44, Fig. 6, provided with a lug or projection 45, which lies between two lugs 46 and 47 on the end of the bed 41. Screws 48 and 49 extend through the lugs 46 and 47, respectively, and form shoulders for engaging the lug 45, and by adjusting these screws the amount of lost motion between the slide and bed may be adjusted and the movement of the bed thus varied as desired. The slide 44 is guided upon two bars 50, projecting from the frame 3 and extending through slots 51, formed in said slide. The slide is moved at the proper times first in one direction and then in the other by two cams 52 and 53, secured to the shaft and arranged to engage rolls 54 and 55, respectively, mounted on the slide. During the forward movement of the cutter-carriage the roll 54 rides on the circular part of the cam 52 and the bed is rigidly clamped between the lug 45 and an adjustable screw 56, which is mounted in a lug 57 on the frame and engages the side of the bed. After the cutter has passed beyond the gear-blank the cam 52 passes roll 54 and cam 53 engages roll 55, moving the slide 44 to the right in Fig. 6. This movement of the slide swings the bed on its pivot, and as the roll 55 reaches the swell of the cam 53 the bed is clamped between the lug 45 and an adjustable screw 58. During the return movement of the carriage the roll 55 rides on the circular part of cam 53 and holds the bed firmly against the screw 58. After the cutter has passed the gear-blank on the return movement the cam 52 engages the roll 54 and moves the bed back against the screw 56.

Since the greater part of the stock is removed by the cutter during the forward movement of the carriage, the return movement may be made at a more rapid rate, and therefore the cam 53 has a shorter circular part than cam 52.

The carriage is reciprocated by means of a cam 59, Fig. 5, secured to shaft 22 and provided with a cam-groove 60, engaged by a roll 61, which is carried by a stud 62, secured in a sliding bar 63. The bar 63 is guided in a groove 64, formed in the frame 3, which projects up at both ends of the cam 59 through an opening 65, formed in the bed 41, Figs. 4 and 5. A roll 66 is mounted on a stud 67, projecting from the upper face of the bar 63 and engaging a curved slot 68 in the cutter-carriage. As the shaft revolves the bar 63 is reciprocated and by reason of its connection with the carriage reciprocates said carriage without interfering with the swinging movement thereof. The cam-groove 60 is so shaped that the return movement of the carriage is more rapid than the forward movement, since the cut is not so heavy on the return movement. The shaft 22 is continuously driven by means of a worm-wheel 69, secured thereto, which is engaged and driven by a worm 70, secured to the transverse driving-shaft 40. Power is applied to the driving-shaft through a pulley 71, secured thereto. During each revolution of the shaft 22 the cutter is advanced through the blank to form one side of a tooth, the angular relation between the cutter and blank is changed by swinging the swivel-bed about its pivot, the cutter is returned and cuts the opposite side of a tooth, the swivel-bed is swung back, and the blank is indexed preparatory to cutting another space between the teeth. When the blank has been indexed through a single revolution, the gear-teeth have been cut upon both sides, and the machine is stopped and a fresh blank inserted.

Should the width of the cutter be the same as the width of the space between the teeth at their inner ends, then the axis about which the cutter-carriage swings should be in line with the inner ends of the teeth; but should the cutter be thinner than the space between the teeth, however, then the line of the axis should lie beyond the inner ends of the teeth. Means are therefore provided for varying the relative position of the axis and the work, and this is preferably done by adjusting the work-support, although it will be understood that the same result could be effected by adjusting the axis.

In the drawings the standard 2, which carries the work-supporting spindle 1, is mounted on ways on the frame 3 and may be adjusted to vary the relative position of the pivot 42 and the work by means of a screw 72, which is journaled in a bracket 73, secured to the standard 2, and engages a nut 74 on the frame 3.

What I claim as my invention, and desire to secure by Letters Patent, is—

1. The combination of a work-support, a cutter-support, mechanism for reciprocating one of said elements, and mechanism for so changing the angular relation between the work and cutter between the forward movement and the return movement of the reciprocating element that the cutter will act on one side of a tooth on the forward movement and on the opposite side of a tooth on the return movement, substantially as described.

2. The combination of a work-support, a cutter-support, mechanism for reciprocating one of said elements, and mechanism for changing the angular relation between the cutter and work after the forward movement and restoring said angular relation after the return movement of the reciprocating element, and maintaining said work and cutter in the same angular relation during the cutting, substantially as described.

3. The combination of a work-support, a cutter-support, mechanism for reciprocating one of said elements, mechanism for changing the angular relation between the cutter and work after the forward movement of the reciprocating element, and maintaining said work and cutter in the same angular relation during the cutting, and mechanism for indexing the work after each return movement of the reciprocating element, substantially as described.

4. The combination of a revoluble work-support, a rotary cutter-shaft, mechanism for reciprocating one of said elements, mechanism for indexing the work-support after each reciprocation of said reciprocating element, and mechanism for changing the angular relation between the cutter and work between the forward movement and the return movement of the reciprocating element, and maintaining said work and cutter in the same angular relation during the cutting, substantially as described.

5. The combination of a revoluble work-support, a rotary cutter-shaft, mechanism for reciprocating one of said elements, mechanism for indexing the work-support after each return movement and means for changing the angular relation between the cutter and work after each forward movement of the reciprocating element and maintaining said work and cutter in the same angular relation during the cutting, substantially as described.

6. The combination of a work-support, a cutter-carriage, mechanism for reciprocating said carriage, and mechanism for so changing the angular relation between the carriage and work between the forward movement of the carriage and the return movement thereof that the cutter will act on one side of a tooth on the forward movement, and on the opposite side of a tooth on the return movement, substantially as described.

7. The combination of a work-support, a cutter-carriage, mechanism for reciprocating said carriage, mechanism for indexing the work-support after each return movement of the carriage, and means for changing the angular relation between the carriage and work after each forward movement of the carriage and maintaining said work and cutter in the same angular relation during the cutting, substantially as described.

8. The combination of a work-support, a cutter-carriage, mechanism for reciprocating said carriage, mechanism for indexing the work, and mechanism for changing the angular relation between the carriage and work after each forward movement and restoring the angular relation after each return movement of the carriage and maintaining said work and cutter in the same angular relation during the cutting, substantially as described.

9. The combination of a work-support, a cutter-carriage, mechanism for reciprocating said carriage, and mechanism for so swinging the carriage about an axis after each forward movement of said carriage that the cutter will act on one side of a tooth on the forward movement, and on the opposite side of the tooth on the return movement, substantially as described.

10. The combination of a work-support, a cutter-carriage, mechanism for reciprocating said carriage, and mechanism for swinging said carriage about an axis in one direction after each forward movement and for swinging said carriage in the opposite direction after each return movement, and preventing the swinging of said carriage during the cutting, substantially as described.

11. The combination of a work-support and a swivel-bed, a cutter-carriage mounted to reciprocate on said bed, and mechanism for so moving said bed about its axis after each forward movement of the carriage that the cutter will act on one side of a tooth on the forward and on the opposite side of a tooth on the return movement, substantially as described.

12. The combination of a work-support, a swivel-bed, a cutter-carriage mounted to reciprocate thereon, mechanism for moving said bed about its axis after each forward movement and in the opposite direction after each return movement of the carriage, and holding said bed stationary during the cutting, substantially as described.

13. The combination of a swinging bed, a cutter-carriage mounted to reciprocate therein, and mechanism for moving said bed about its axis between the forward and return movement of the carriage, returning said bed to its former position after each return movement and holding said bed stationary during the cutting, substantially as described.

14. The combination of a swivel-bed, a cutter-carriage mounted to reciprocate thereon, and mechanism for moving said bed about its axis between the forward and return movements of the carriage, returning said bed to its former position after each return movement and clamping said bed in position during the cutting, substantially as described.

15. The combination of a swivel-bed, a carriage mounted to reciprocate thereon, a transverse slide for swinging said bed about its axis, and cams for reciprocating said slide, substantially as described.

16. The combination of a swivel-bed, a carriage mounted to reciprocate thereon, stops at the sides of said bed, and means for moving and holding said bed against said stops alternately, substantially as described.

17. The combination of a swivel-bed, a carriage mounted to reciprocate thereon, a transverse slide provided with a lug or projection, adjustable shoulders on said bed for engaging said lug, and means for reciprocating said slide, substantially as described.

18. The combination of a swivel-bed, a carriage mounted to reciprocate thereon, a transverse slide provided with a lug or projection, shoulders on said bed for engaging said lug, means for adjusting the lost motion between said lug and shoulders, stops for engaging the bed, and means for operating said slide, substantially as described.

19. The combination of a swivel-bed, a carriage reciprocating thereon, mechanism for oscillating said bed, a sliding bar mounted in stationary guides, and connected with said carriage, and means for reciprocating said bar, substantially as described.

20. The combination of a swivel-bed, a carriage reciprocating thereon, mechanism for reciprocating said bed, a sliding bar mounted in stationary guides, a projection on said slide engaging a slot in said carriage, and means for reciprocating said slide, substantially as described.

21. The combination of a swivel-bed, of a carriage reciprocating thereon, a rotary shaft, a cam secured thereto for reciprocating said carriage, connection between said cam and carriage, cams on said shaft for oscillating said bed, and connections between said cams and bed, substantially as described.

22. The combination of a work-support, a cutter-support, mechanism for reciprocating one of said elements, mechanism for so swinging one of said elements about an axis between the forward movement and the return movement of the reciprocating element that the cutter will act on one side of a tooth on the forward movement and on the opposite side of a tooth on the return movement, and means for varying the relative position of the axis and work, substantially as described.

23. The combination of a work-support, a cutter-carriage, mechanism for reciprocating the cutter-carriage, mechanism for so swinging said carriage about an axis after each forward movement of the carriage that the cutter will act on one side of a tooth on the forward movement, and on the opposite side of a tooth on the return movement, and means for varying the relative position of the axis and work, substantially as described.

24. The combination of a work-support, a cutter-carriage, mechanism for reciprocating the cutter-carriage, mechanism for so swinging the cutter-carriage about an axis after each forward movement that the cutter will act on one side of a tooth on the forward movement, and on the opposite side of a tooth on the return movement, and means for adjusting the work-support relative to said axis, substantially as described.

EDWARD H. PARKS.

Witnesses:
W. H. THURSTON,
R. A. BATES.